July 7, 1936.　　　　B. M. CARTER　　　　2,046,500
METHOD FOR TREATING GASES
Filed Aug. 11, 1930　　　3 Sheets-Sheet 1

INVENTOR
*B. M. Carter*
BY
ATTORNEY

July 7, 1936.  B. M. CARTER  2,046,500
METHOD FOR TREATING GASES
Filed Aug. 11, 1930  3 Sheets-Sheet 2

INVENTOR
B. M. Carter
BY
ATTORNEY

July 7, 1936.  B. M. CARTER  2,046,500
METHOD FOR TREATING GASES
Filed Aug. 11, 1930  3 Sheets-Sheet 3
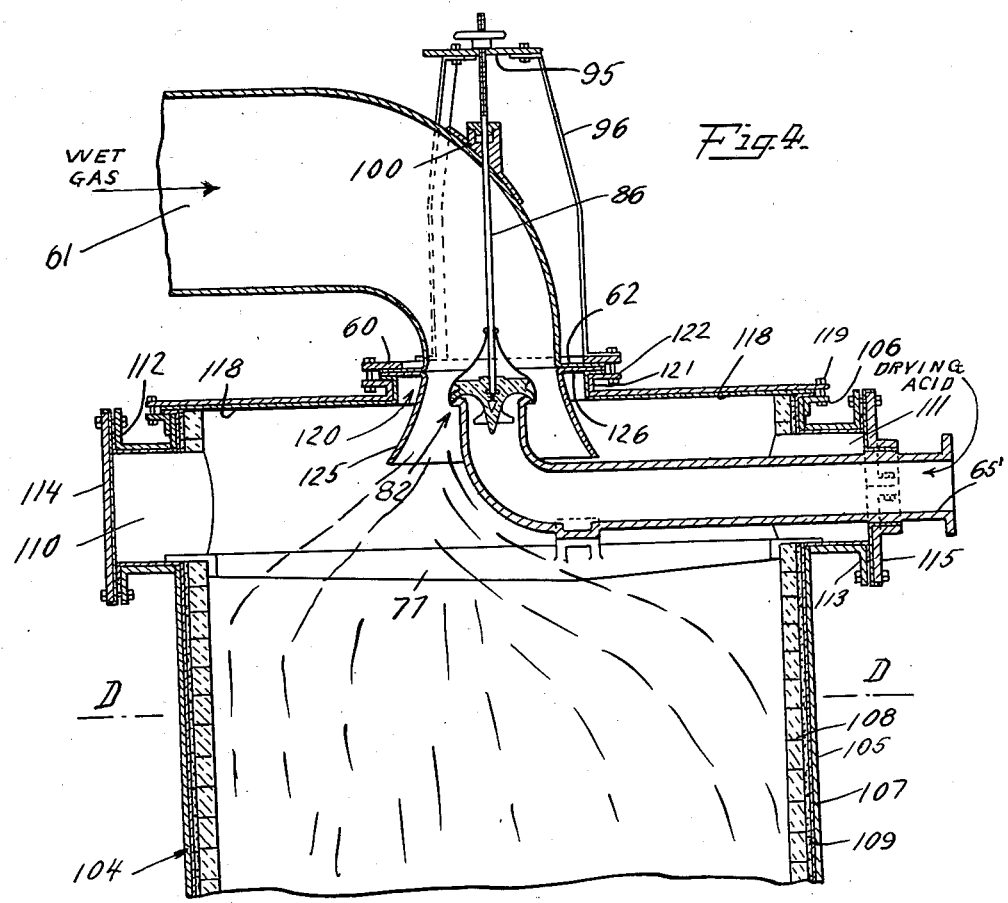
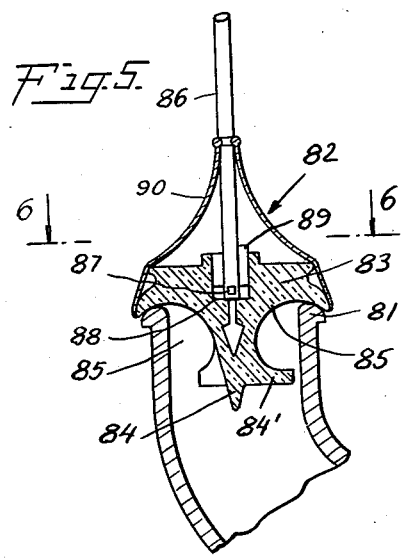
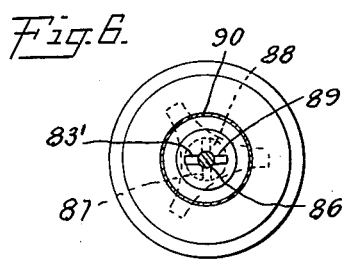
INVENTOR
*B.M. Carter*
BY
ATTORNEY Patented July 7, 1936

2,046,500

UNITED STATES PATENT OFFICE 2,046,500

METHOD FOR TREATING GASES

Bernard M. Carter, Montclair, N. J., assignor to General Chemical Company, New York, N. Y., a corporation of New York Application August 11, 1930, Serial No. 474,458

8 Claims. (Cl. 23—178)

This invention is directed to a process and apparatus for conducting reactions involving the contacting and intimate admixture of a gas and a liquid. The invention is of general application for treatments involving physical and/or chemical interactions between liquids and gases, and includes, for example among others, treatments in solvent recovery, ammonia absorption, nitric acid absorption, sulfur burning, and the drying of gases such as air and sulfurous gases. One phase of the invention is particularly directed to the drying of gases, and for convenience only, the invention will be described in connection with the treatment or drying of sulfurous gases prior to the utilization of the same in the manufacture of sulfuric acid.

Heretofore, the drying of sulfurous gases, prior to employment of the same in the manufacture of sulfuric acid, has been commonly effected by passing the gas upwardly through a drying tower suitably packed with quartz or tile against a counter-current flow of sulfuric acid which is caused to trickle down over the packing in the tower. It will be understood that the primary problem in such drying operation, and in fact in all such processes involving the intimate contacting of a gas and a liquid, is to obtain a uniform distribution of the treating liquid throughout the treatment zone, and to secure an intimate and sufficiently prolonged admixture of liquid and gas. Uneven distribution of treating liquid gives rise to channeling, the result of which is poor contacting of gas and liquid as a whole, and in many instances, total lack of contact between some portions of the gas and liquid. As noted, such treatments, particularly the treatment and drying of gases by acid, have been usually conducted by counter-current flow of liquid and gas. Varying degrees of satisfaction have been obtained in the drying of gases by acid, by the provision of a comparatively large number of distributing pipes and nozzles in the top of a drying tower or treating chamber. Such equipment, to obtain a satisfactory distribution of liquid to any extent, necessarily involves the utilization of a large number of liquid or acid outlets, such outlets being individually of small cross-section. From time to time, the acid or liquid outlets of small cross-section become clogged and stopped up by foreign material in the liquid. The result is a cessation of liquid or acid flow through such outlet or outlets with the consequent channeling in treating chamber, and the passage of gas therethrough without subjecting the same to the action of the treating liquid. Corrosion of the necessarily lightly constructed liquid outlets frequently results in leakage and introduction of sizable acid or liquid streams into the treating chamber, and such liquid then becomes mechanically entrained in the gas stream and gives rise to difficulties further on in the process.

The present invention aims primarily to provide a process by which a more even distribution of a treating liquid through a given treating or reaction zone may be obtained, and by which an intimate and evenly dispersed mixture of liquid and gas may be initially secured and subsequently maintained throughout the period of contact of the liquid and gas. Briefly, the invention comprises the introduction of a gas and a liquid, for example a gas to be dried such as a sulfurous gas, and a drying agent such as sulfuric acid, into a reaction chamber or drying tower, initially forming an intimate mixture of the gas and the liquid by causing the liquid to be evenly dispersed throughout the gas stream, and then prolonging the contact of the gas and the liquid by passing the gas and the liquid in co-flow relation through the treating chamber. The invention further comprehends in a general way the improved method of forming an intimate mixture of a gas and a liquid which includes the introduction of a sheet of liquid into a stream of rapidly moving gas in such manner as to intersect the gas stream, and substantially simultaneously on the initial contact of the gas and liquid causing an expansion and a decrease in velocity of the gas stream, and an increase in dispersion of the particles thereof to thus effect an initial mixture of gas and liquid and a substantially complete dispersal of liquid particles throughout the gas stream.

The invention is further directed to the provision of apparatus for effecting the improved process, the apparatus being of such simplicity of design and composed of so few operative parts, that the same may be solidly and ruggedly constructed in such manner as to reduce maintenance to a minimum, and to effect great economies in primary installation costs.

Other objects and features of novelty will be apparent from the following description when taken in connection with the accompanying drawings in which Fig. 1 is a composite vertical section of the drying tower. That portion of Fig. 1 below the line A—A is a vertical section on the line B—B of Fig. 2; and that portion of Fig. 1 above the line A—A is a vertical section on the line C—C of Fig. 2.

Fig. 4 is a composite vertical section similar to Fig. 1 of a modified form of the invention.

Fig. 5 is an enlarged vertical section of a distributing valve.

Fig. 6 is a horizontal section on the line 6—6 of Fig. 5.

Figure 1:
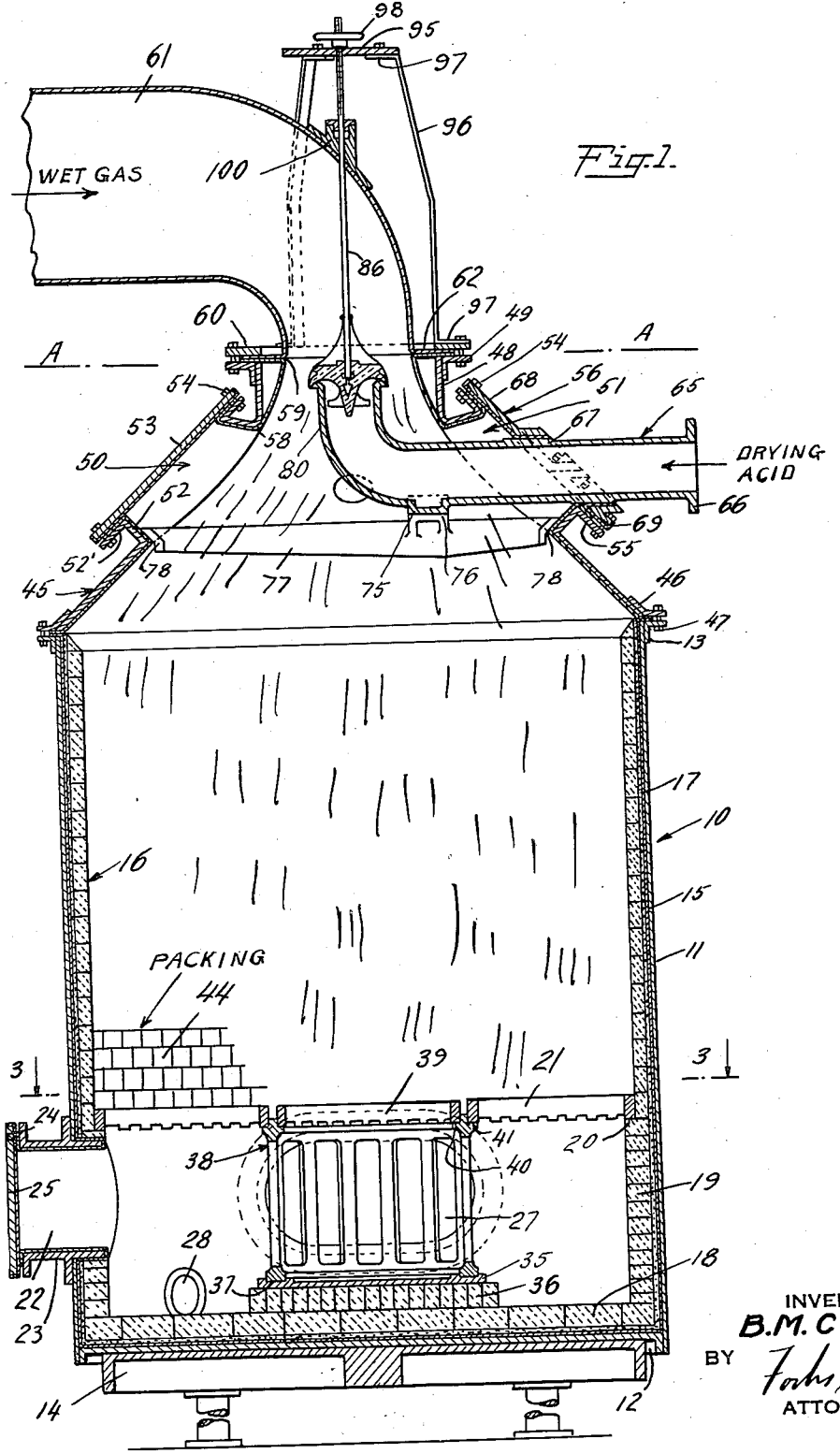

The tower 10 comprises a cylindrical steel shell or body 11 welded or otherwise attached at its lower edge to a circular base member 12, and provided at its upper edge with a horizontally disposed flange member 13 riveted or otherwise secured to the steel shell. The drying tower may rest on any suitable support as indicated at 14. The shell 11 is lined on the sides and bottom with a layer of chemical lead 15. It will be observed that the upper edge of lead lining 15 extends above the upper edge of the steel shell, and is flattened out to form an annular rim covering the upper surface of the flange 13. Within the lead lining 15, the steel shell is further lined with a layer of acid-proof brick, indicated generally at 16. The brick lining is secured and held in place by a layer of cement 17, composed for example of a mixture of silicate of soda and silex, interposed between the lead lining and the outer faces of the bricks. The bottom of the tower is covered with a comparatively heavy layer 18 of acid-proof brick. It is to be observed that the bricks 19 in the lower section of the cylindrical portion of the tower are placed horizontally, and the bricks running to the top of the shell 11 are set on edge. The upper layer of horizontally disposed bricks 19 provides a circular ledge 20 which affords a support for the outer circumference of the outer grille bars 21. The brick lining in the upper section of the tower terminates at the top end of the steel shell 11.

The tower is provided with a manhole 22, the casing 23 of which is set in cement into the lower wall of the tower and suitably riveted to the shell 11. At the opening in the tower wall for the manhole casing 23, the lead lining 15 is projected inwardly around the inner end of the casing 23, and thence outwardly throughout the inside of the casing to provide a lead lining for the same. The outer end of the lead lining of the manhole casing 23 terminates in an annular flange 24 covering the end flange of the casing 23. The lead-lined manhole cover 25 is detachably held in place by suitable clamps or bolts not shown. The drying tower is provided at its lower ends with the gas outlets 26 and 27, and the acid outlets 28, 29 and 30. The casings forming the gas and acid outlets are set into the lower wall of the tower in a similar manner as described in connection with the manhole casing 23.

The circular bearing ring 35 is arranged as shown in Fig. 1 and rests on suitable acid-proof brickwork 36. An annular groove 37 is cut into the upper surface of the ring 35 and is adapted to receive the lower ends of the several sections of the center grille support indicated generally at 38. The center grille support 38 is made in separate sections of a size convenient for handling, which when assembled in place on the bearing ring 35, as shown in Fig. 1, affords suitable support for the inner ends of the outer grille bars 21, and for the center grille bars 39. As shown, the sections of the grille support 38 have formed on their upper ends the inner and outer ledges 40 and 41. The ledge 41 forms a support for the inner ends of the outer grille bars 21, and the inner ledge 40 provides a support for the center grille bars 39.

Figure 3:
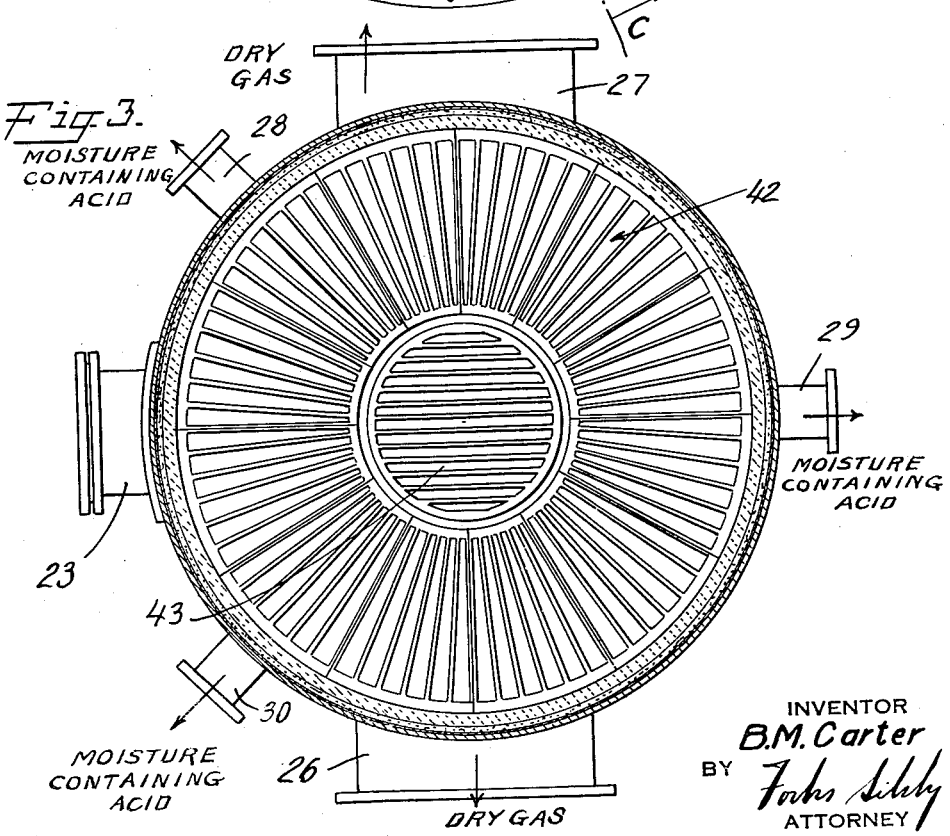
Fig. 3 is a horizontal section on the line 3—3 of Fig. 1.

The grille bars may be of any suitable construction. The outer bars may comprise a series of individual bars each supported at its ends by ledges 20 and 41, or for convenience, the outer grille bars may be formed in a series of segmental portions indicated generally as at 42 in Fig. 3. In the present embodiment of the invention, the center grille bars 39 are all cast together in a single circular unit 43. The grille bars, the grille bar support 38 and the bearing ring 35 are all made of some such suitable material, duriron for example, which is substantially unaffected by the action of the acid and gas in the drying tower.

The tower is provided with packing indicated generally at 44. The packing may consist of spiral tiles stacked on the grille bars in any suitable manner, and extending from the grille bars upwardly to within a few inches of the upper edge of the steel shell 11.

The cylindrical section of the tower is surmounted by a steel cone-shaped top indicated generally at 45. The lower edge of the top 45 has welded or otherwise fixed thereto the horizontally projecting flange 46 which, in conjunction with the several bolts 47, affords means for connecting the cone-shaped top to the shell 11. The upper end of the cone-shaped top member 45 terminates in a substantially cylindrical section 48 having attached to its upper edge a horizontally projecting flange 49.

The top member 45 is provided with a manhole 50, and an acid inlet pipe opening 51. The manhole opening 50 is formed by an outwardly projecting somewhat cylindrical member 52 terminating in an annular flange 52'. The manhole cover 53 is detachably held in place by suitable bolts 54. The acid inlet pipe opening 51 is similarly formed, and terminates with a circular flange 55 to which the acid pipe flange indicated generally at 56 may be attached by bolts 54.

The cone top 45 is provided with a lead lining 57, the lower circular edge of which is clamped between the flanges 13 and 46. The lead sheeting extends upwardly, and thence outwardly through the manhole 50 and the acid inlet pipe opening 51. The flanges on the ends of the outwardly projecting lining portions are so arranged as to permit clamping the same between the manhole cover 53, flange 52', and between the pipe flange 56 and the flange 55. At the upper end of the top member 45, the lead lining does not follow the contour of the cylindrical portion 48, but continues its upward cone-shaped formation as indicated between the points 58 and 59, and ends in a horizontally disposed circular flange which is clamped between the flange 49 and the ring 60. The lead lining between the points 58 and 59 is supported by suitable lead ribs, not shown, so as to maintain the approximate conical formation as shown in the drawings. The upper circular end of the approximately cone-shaped lead lining may be considered as defining the inlet of the drying tower.

The lead flue 61, the transverse cross-section of which is continuously diminished as the end of the flue is approached, terminates in a horizontally projecting circular flange 62 which is clamped together with the flange on the upper end of the lead lining of the cone-shaped top of the tower between the flange 49 and the ring 60.

Figure 2:
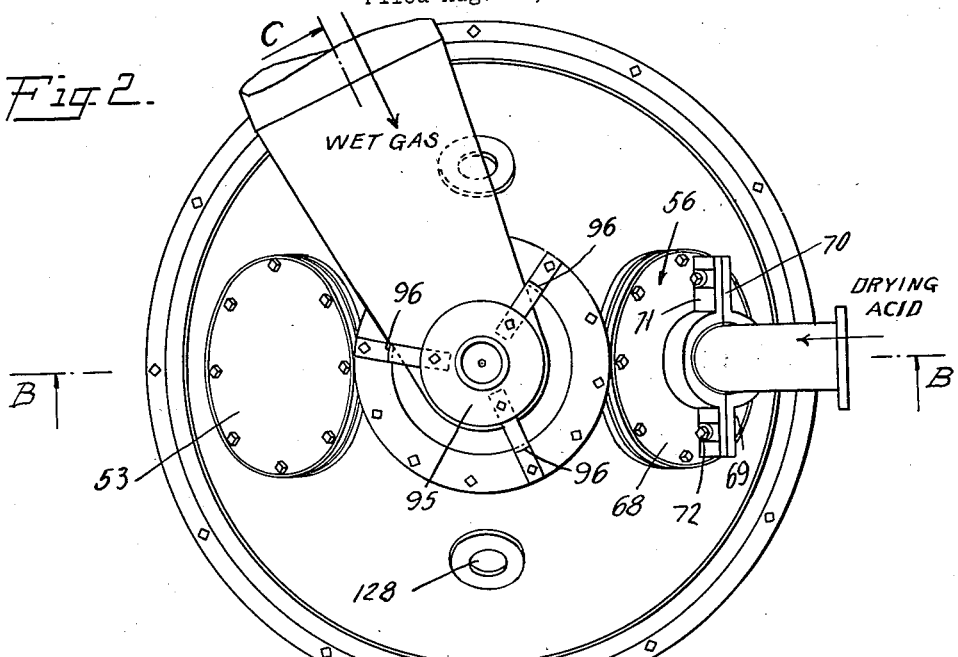
Fig. 2 is a plan view of the drying tower.

The numeral 65 indicates the acid inlet pipe having on its outer end a flange 66 affording means for connecting the pipe 65 to an acid or other liquid feed line. The acid inlet pipe is provided with a collar portion 67 forming a seat for the inlet pipe flange 56. As shown in Fig. 2, the flange 56 comprises two sections 68 and 69, the sections including cooperating flanges 70 and 71, each having semi-circular portions which are adapted to seat on the collar portion 67 of the pipe 65. The two sections 68 and 69 are bolted together by bolts 72, and thus form the unitary flange member 56. The inner side of the flat face of the flange 56 and the inner sides of flanges 70 and 71 are lead lined as indicated in Fig. 1.

A projection 75 formed on the lower side of the inlet pipe 65 registers with a seat 76 cast with and forming a part of the acid inlet pipe supporting bar 77. The supporting member 77 is a single bar having on either end projections 78 which are adapted to rest in and be supported by the lower circumference of the manhole 50 and the opening 51 as clearly shown in Fig. 1.

The inlet end of the pipe 65 includes an upwardly extending section 80 terminating in the rounded annular lip 81 which cooperates with a distributing valve indicated generally at 82, for introducing the acid or other liquid into the tower in the form of a cone-shaped sheet.

The construction of the acid distributing valve 82 and the manner of its association with the inner end of the acid inlet pipe is clearly shown in Fig. 5. The distributor proper, indicated at 83, is preferably of porcelain and has on its lower side an inverted cone-shaped appendage 84 which serves to split the incoming liquid stream. The cone-shaped surface of appendage 84 spreads and forms the concave portions 85, the outer circumference of which seats on the rounded lip 81. The projections 84' provide guides to keep the valve centered in all vertical adjustments.

Vertical adjustment of the distributor 83 is effected by raising the stem 86. The lower end of the stem 86 has attached thereto a short transverse pin 87. The porcelain distributor 83 has a slotted opening 83' in the top thereof which is adapted to receive the lower end of the valve stem 86 and the transverse pin 87. To attach the stem to the distributor 83, the pin on the lower end of the stem is inserted in the slot 83' in the upper face of the distributor, rod 86 is pushed downwardly to the position shown in Fig. 5 and then given a quarter turn so that the pin 87 becomes seated in a recess 88. A short pin 89 is then inserted in one end of the slot 83' and driven down to the bottom of the recess 88. The pin 89 thus prevents the removal of the stem from the member 83. After the pin 89 is set in the slot, the latter is filled with molten sulfur, which solidifies and closes all open parts of the slot and the recess 88. After the rod 86 is secured in place, the lead apron 90 is arranged as shown in Fig. 5, and serves the double purpose of acting to protect the joint between the rod and the distributor member, and to split the gas stream entering the drying tower from the flue 61.

The valve stem supporting plate 95 is held in the position shown in Fig. 1 by three bracket members 96 having on their upper and lower ends the horizontally projecting portions 97 which afford means for connecting the brackets 96 to the ring 60 and the plate 95 respectively. The plate 95 is bored at the center to slidably receive and support the valve stem 86. The upper end of the valve stem 86 is threaded into an internally threaded sleeve bearing on plate 95 and formed integrally with the hand wheel 98. The stem 86 is longitudinally slotted to receive a short stud or key projecting inwardly from the edge of the bore in the plate 95 to prevent rotation of the valve stem. A stuffing box 100 is formed on the upper side of the inlet flue 61, as shown in Fig. 1, to provide for admission of the valve stem to the center of the gas flue. The stuffing box 100 is packed with any suitable material such as asbestos rope, to prevent the passage of gas therethrough.

In connection with Fig. 1, it will be recalled that the cone-shaped top member 45 is constructed with a lead lining 57. This lead lining is quite adaptable for use in apparatus where the gas being dried in the tower is treated with a comparatively weak acid, that is, an acid of a concentration of say something less than 66° Bé. When a stronger drying acid is used, such lead lining would be unsuitable for use over an extended period of time because such lining would be slowly corroded, and accordingly require frequent shutting down of the apparatus for the purpose of making necessary repairs. In circumstances where it is desirable to use a stronger drying acid, it would be necessary to construct the cone top 45 of some material which is unaffected by the stronger acid. This difficulty could be met by constructing the top 45 of duriron or some suitable substance which is substantially unaffected by strong acids. It will be understood, however, that apparatus of the type described is comparatively large, and that the vertical dimension of the cone top 45 would, in most instances, vary between 3 and 5 feet. It will thus be obvious that a top member of such dimensions made of duriron or other resistant material would be a large item of expense in the construction of the tower. To overcome this difficulty, and still accomplish the objects of the invention, the modified form of the apparatus disclosed in Fig. 4 has been devised. The construction shown in Fig. 4 is such that substantially the same dispersion of the gas and acid may be obtained in the top of the tower without employing the full cone top as in Fig. 1.

Referring to Fig. 4, the general construction of the tower 104, the acid inlet pipe, the gas inlet flue, the distributing valve and the associated parts is substantially as already described in connection with Fig. 1. In Fig. 4, the line D—D indicates approximately the upper surface of the packing in the tower. The cylindrical steel shell 105 is extended vertically upward and has affixed to its upper edge a horizontal flange 106. The tower 104 is provided with a lead lining 107 similarly arranged as lining 15 in the tower 10. The lining 107 is extended to the top of the tower 104, and folded over to cover the upper surface of the flange 106. The acid-proof bricks 108 are held in place by a layer of cement 109, interposed between the bricks 108 and the lead lining 107. The brickwork extends to the top of the tower. The upper end of the tower is provided with a manhole 110 and an acid inlet pipe opening 111. The interior of the casings forming the openings 110 and 111 are lead lined as described in connection with the openings 50 and 51, of Fig. 1. The linings in the manhole 110 and the acid inlet pipe opening 111 terminate in annular flanges arranged to be clamped between the flanges 112 and 113 and the manhole cover 114 and the acid inlet pipe flange 115. The pipe flange 115 is constructed similarly to the flange 56 of Fig. 1 except, of course, that it is arranged to be disposed at a right angle with respect to the longitudinal axis of the inlet pipe 65' of Fig. 4. It will be observed that the inner end of the pipe 65' is held in place by a supporting bar 77 in the same manner as in the construction of Fig. 1.

The upper end of the drying chamber is closed off by the circular top 118 attached to the cylindrical section of the tower by a series of bolts 119. The cover 118 is provided at its center with an opening 120 formed by the short upwardly extending cylindrical portion 121, terminating in a horizontally disposed flange 122. The underside of top 118 is protected by the lead sheeting 118'. The inlet flue 61 is of the same configuration and constructed as in Fig. 1, and terminates at its lower end in the flange 62 which, as in Fig. 1, is clamped between the flange 122 and the ring 60. Ring 60 and the flange 122 are bolted together as indicated in the drawings. The construction of the distributing valve 82, the means for adjusting it, and the supporting plate 95 are as in Fig. 1.

It will be recalled, with reference to Fig. 1, that that portion of the lead lining between the points 58 and 59 forms a part of the gas inlet passage. In the construction of Fig. 4, this portion of the gas passage having a constantly increasing cross-section is provided by the approximately frusto-conical collar or conduit section 125. The section 125 includes a circular flange 126 which is adapted to be clamped between the flange 122 and the ring 60, and thus held in the position shown in Fig. 4. This conduit section 125 is preferably made of duriron or some such material which is substantially unaffected by strong acids.

For convenience, the operation of the improved process will be described in connection with the utilization of sulfurous gases prior to the utilization of the same in the manufacture of sulfuric acid.

Referring to Fig. 1 in particular, the tower 10 is suitably packed in the manner familiar to those skilled in the art so that the top of the packing reaches to within a few inches of the top of the brickwork 16. All of the drying acid is introduced into the tower by gravity feed through the acid inlet pipe 65. The rate of flow of acid into the pipe 65 may be regulated by a suitable valve, not shown, in the acid feed line. The gas flue 61 is connected to a source of supply of sulfur dioxide containing gases. It will be understood, of course, that the tower 10 is simply one unit of an entire plant, comprising, as is known in the art, the usual sulfur burners or roasters, gas purifiers, heaters, converters, heat transferrers, absorbers, etc. For the purpose of example, it will be assumed that a comparatively weak acid is being used in drying the gas. Hence the cone top 45 as constructed in Fig. 1 with the lead lining 57 may be employed.

It will be observed that the gas inlet conduit 61 has a normally comparatively large cross-section. However, the end of the conduit 61 diminishes sharply in cross-section as it approaches the inlet of the cone top until at the actual point of connection with the inlet of the cone top 45, the conduit is of a minimum and materially restricted cross-section. The cone top 45, together with that comparatively small portion of the cylindrical tower above the packing therein, may conveniently be designated as a gas-distributing section, the horizontal cross-section of which increases at a rapid rate throughout substantially its entire vertical length. The combination of the gas inlet conduit 61 and the cone top 45 provide what may be considered a gas inlet passage, such passage having a constricted portion of a minimum cross-section at the joint between the flue 61 and the top of the cone top 45, or in other words at the tower inlet. It will be seen that the result of such construction is to produce a Venturi tube effect in the drying tower just above the packing therein. As is known generally, such a construction in a gas passage causes a gradual increase in velocity in the gas stream passing therethrough which reaches a maximum at the point of minimum cross-section of the gas passage. As the cross-section of the gas passage again increases beyond the constriction, the velocity of the gas stream decreases, and the gas stream tends to expand rapidly with a correspondingly increased dispersion of the gas stream.

As previously explained, and as will be fully appreciated from a consideration of Fig. 5, the result of the construction of the distributing valve 82 and its relation with the outlet end of the acid pipe 65 is such as to effect an introduction of acid into the tower in the form of a cone-shaped sheet in an instance where no gas is passing the constricted portion of the gas passage. The quantity of liquid in the liquid sheet itself is dependent upon the adjustment of the valve 82 with respect to the end of the pipe 65. The spread or horizontal dimension of the cone of liquid or acid is such that the liquid sheet intersects substantially the entire gas stream when gas is passing the inlet into the tower.

In practice, gas to be treated, particularly where the invention is utilized in the drying of sulfurous gases, passes through the most constricted section of the gas inlet passage at a velocity varying between say 40 and 100 linear feet per second. The valve 82 is adjusted so as to admit the desired quantity of acid necessary to dry gas passing through the tower. It will be noted that the distributing valve is located substantially in the most restricted portion of the gas inlet passage. When both acid and gas are flowing, the velocity of the gas stream is greatest at the most restricted portion of the gas passage, and substantially immediately on contact of the gas stream and the acid, the cone of acid is broken up into a very fine spray, and the particles of acid in the form of spray are dispersed and spread out evenly through the entire cross-section of the gas stream. This thorough admixture of liquid and gas is further materially promoted by the constantly increasing cross-section of the gas stream as the same expands during its passage through the cone-top. It is thus apparent that the invention is such that by the time the gas and liquid strike the top layer of packing, the admixture of the two is so thorough and the dispersion of the liquid in the gas so complete that the liquid and gas take substantially the form of a heavy mist. Once this thorough admixture of gas and liquid is effected, the two pass in co-flow relation through the tower, passing down over the packing into the acid and gas separation chamber beneath the grille bars. Here the acid and gas separate, the gas leaving the tower through the outlets 26 and 27 and the acid draining out of the tower through outlets 28, 29 and 30.

In the present invention, the gas leaving the tower 10 may be passed through two scrubbing towers, not shown, arranged in parallel, one scrubber connected to each outlet 26 and 27 of the drying tower. The gas passes upwardly through the scrubbers which are each of suitable vertical dimensions and suitably packed to afford sufficient opportunity for the separation of entrained particles of liquid from the gas stream leaving the drying tower 10.

During the process of formation of the mixture of liquid and gas in the cone top, conditions therein are readily observable through the sight glasses 128 set in the cone top 45. This is of particular advantage as the condition of the mixture can be observed and adjusted before passage of the mixture through the packing. In prior methods and apparatus, the conditions of drying were not determinable in advance, and improper drying conditions were only discovered further on in the process after detrimental results were already incurred.

The operation of the process during the employment of the equipment disclosed in Fig. 4 is substantially the same as that already described in connection with Fig. 1. As noted, the primary purpose of the construction shown in Fig. 4 is the elimination of the necessity of utilizing a cone top made of some expensive resistant material such as duriron. Where a strong drying acid is used, the employment of some such material is necessary because the lead lining 57 of Fig. 1 would not be sufficiently resistant to the action of the stronger acid. The most constricted portion of the gas inlet passage in Fig. 4 is at the joint between the flue 61 and the collar or conduit section 125, or in other words, at the inlet of the tower, the same as in the construction of Fig. 1. The collar 125 extends down into the chamber of the tower sufficiently to fully initiate the admixture of liquid and gas which proceeds to completion in the distributing section of the tower above the packing and before the mixture of gas and liquid reaches what may be termed the body portion of the tower or reaction chamber.

The underside of the top 118 and the inside of the casings forming the manhole 110 and the acid inlet pipe opening 111 are sufficiently protected by a lead lining as there is no direct contact between these parts and the acid and gas mixture. The inlet pipe 65' and the supporting bar 77 are made of duriron or some similar resistant material as in the construction of Fig. 1. As in the apparatus of Fig. 1, conditions within the mixing zone above the packing stacked in the chamber may be readily observed through sight glasses suitably arranged about the circumference of the upper end of the shell.

I claim:

1. The method of effecting intimate contact of gas and liquid which comprises introducing into a contacting chamber, of initially restricted and of sharply increasing cross-sectional area, a stream of the gas of restricted cross-sectional area and flowing at a relatively high linear velocity at the point of introduction into said chamber, flowing the gas stream through a path defined by said chamber and having a sharply increasing cross-sectional area and extending a substantial distance beyond the point of introduction of the gas into said chamber, dispersing liquid particles in the gas stream substantially immediately after initiating the increase in cross-sectional area of the gas stream, distributing the gas stream containing the dispersed liquid particles over an area many times larger than that of the said restricted cross-sectional area, and flowing the thus dispersed liquid particles in contact with said gas stream for a substantial period of time.

2. The method of treating gas with a liquid comprising forming in a treating chamber, of initially restricted and of sharply increasing cross-sectional area, a dispersion of the gas and liquid by introducing into the treating chamber at the point of said restriction a constricted stream of the gas and initiating a decrease in velocity and an increase in dispersion of the gas stream substantially at the point of introduction of the gas stream into said chamber and continuing the decrease in velocity and increase in dispersion of the gas stream for a substantial distance beyond the point of introduction into said chamber, dispersing liquid particles in the gas stream substantially immediately after initiating said decrease in velocity and increase in dispersion of the gas stream, then distributing the gas-liquid dispersion over an area many times larger than that of the gas stream at its constricted point, and flowing the dispersed liquid particles in contact with gas for a substantial period of time.

3. The method of treating gas with a liquid in a treating chamber of initially restricted and of sharply increasing cross-sectional area comprising introducing liquid into a stream of the gas while constricting the gas stream to create velocity thereof to substantially completely break up the liquid stream and disseminate the liquid particles, immediately flowing the gas stream and the contained liquid particles through a path defined by said chamber and having a sharply increasing cross-sectional area and extending a substantial distance beyond the point of initial admixture of gas and liquid, said liquid being introduced into the gas stream substantially immediately after initiating the increase in cross-sectional area of the gas stream, then distributing the dispersion over an area many times larger than that of the gas stream at its constricted point, and flowing the dispersed liquid particles with the gas for a substantial period of time.

4. The method of effecting intimate contact of gas and liquid which comprises introducing into a contacting chamber, of initially restricted and of sharply increasing cross-sectional area, a stream of the gas of restricted cross-sectional area and flowing at a relatively high linear velocity at the point of introduction into said chamber, flowing the gas stream through a path defined by said chamber and having a sharply increasing cross-sectional area and extending a substantial distance beyond the point of introduction of the gas into said chamber, dispersing liquid particles in the gas stream substantially immediately after initiating the increase in cross-sectional area of the gas stream, distributing the gas stream containing the dispersed liquid particles over an area of packing material in said zone many times larger than that of the said restricted cross-sectional area, passing the liquid and gas in co-flow relation through the packing, and then separating the liquid and gas.

5. The method of effecting intimate contact of gas and liquid which comprises introducing into a contacting chamber, of initially restricted and of sharply increasing cross-sectional area, a stream of the gas of restricted cross-sectional area and flowing at a relatively high linear velocity at the point of introduction into said chamber, flowing the gas stream through a path defined by said chamber and having a sharply increasing cross-sectional area and extending a substantial distance beyond the point of introduction of the gas into said chamber, introducing the liquid, in the form of a cone-shaped sheet having the apex directed against the flow of the gas, into the gas stream substantially immediately after initiating the increase in cross-sectional area of the gas stream, distributing the gas stream containing the dispersed liquid particles over an area of packing material in said zone many times larger than that of the said restricted cross-sectional area, passing the liquid and gas in co-flow relation through the packing, and separating the liquid and gas.

6. In the method of drying sulfurous gases with sulfuric acid in a drying zone, the improvement which comprises introducing into the contacting chamber, of initially restricted and of sharply increasing cross-sectional area, a stream of sulfurous gas of restricted cross-sectional area and flowing at a relatively high linear velocity at the point of introduction into said chamber, flowing the gas stream through a path defined by said chamber and having a sharply increasing cross-sectional area and extending a substantial distance beyond the point of introduction of the gas into said chamber, dispersing sulfuric acid particles in the gas stream substantially immediately after initiating the increase in cross-sectional area of the gas stream, distributing the gas stream containing the dispersed acid particles over an area many times larger than that of the said restricted cross-sectional area, flowing the thus dispersed acid particles in contact with said gas stream for a substantial period of time, and then separating the acid and gas.

7. The method of effecting intimate contact of gas and liquid which comprises introducing into a contacting chamber, of initially restricted and of sharply increasing cross-sectional area, a stream of the gas of restricted cross-sectional area and flowing at a relatively high linear velocity at the point of introduction into said chamber, flowing the gas stream through a path defined by said chamber, and having a sharply increasing cross-sectional area and extending a substantial distance beyond the point of introduction of the gas into said chamber, introducing into the gas, under the influence of gravity flow, a stream of liquid and dispersing liquid particles in the gas stream substantially immediately after initiating the increase in cross-sectional area of the gas stream, distributing the gas stream containing the dispersed liquid particles over an area many times larger than that of the said restricted cross-sectional area, and flowing the thus dispersed liquid particles in contact with said gas stream for a substantial period of time.

8. The method of treating gas with a liquid in a treating chamber, of initially restricted and of sharply increasing cross-sectional area, comprising introducing liquid into a stream of the gas while constricting the gas stream to create velocity thereof to substantially completely break up the liquid stream and disseminate the liquid particles, immediately flowing the gas stream and the contained liquid particles through a path defined by said chamber and having a sharply increasing cross-sectional area and extending a substantial distance beyond the point of initial admixture of gas and liquid, said liquid being introduced into the gas stream substantially immediately after initiating the increase in cross-sectional area of the gas stream, distributing the dispersion over an area of packing material many times larger than that of the gas stream at its constricted point, passing the liquid and gas in co-flow relation through the packing, and separating the liquid and gas.

BERNARD M. CARTER.